US005547272A

United States Patent [19]
Paterson et al.

[11] Patent Number: 5,547,272
[45] Date of Patent: Aug. 20, 1996

[54] MODULAR CABINET BEZEL

[75] Inventors: Robert W. Paterson, Seneca, S.C.; Werner B. Stephan, Augsburg, Germany

[73] Assignee: AT&T Global Information Solutions Company, Dayton, Ohio

[21] Appl. No.: 428,608

[22] Filed: Apr. 24, 1995

[51] Int. Cl.⁶ .................................................. F16B 12/10
[52] U.S. Cl. .................................. 312/223.2; 312/257.1; 312/265.5; 312/265.6; 312/138.1; 312/204; 361/683; 361/695; 361/724
[58] Field of Search ........................... 312/223.2, 223.1, 312/257.1, 138.1, 265.5, 265.6, 204; 361/683, 724, 695

[56] References Cited

U.S. PATENT DOCUMENTS

| | | | |
|---|---|---|---|
| 4,751,872 | 6/1988 | Lawsen, Jr. ........................ | 361/695 X |
| 5,142,442 | 8/1992 | Daniels et al. ..................... | 361/695 X |
| 5,169,218 | 12/1992 | Chu ...................................... | 312/223.2 |
| 5,175,670 | 12/1992 | Wang .................................... | 361/683 |
| 5,236,259 | 8/1993 | Ryan et al. ...................... | 312/223.2 X |
| 5,248,193 | 9/1993 | Schlemmer ........................ | 312/223.2 |
| 5,397,176 | 3/1995 | Allen et al. ......................... | 312/223.2 |
| 5,446,619 | 8/1995 | Madsen et al. .................. | 312/223.2 X |
| 5,447,367 | 9/1995 | Wei ...................................... | 312/223.2 |

Primary Examiner—Jose V. Chen
Assistant Examiner—Rodney B. White
Attorney, Agent, or Firm—Francis L. Conte

[57] ABSTRACT

A modular bezel for the front side of a cabinet includes a bezel frame fixedly joinable to the cabinet, with the frame including a plurality of windows therethrough for providing access into the cabinet. A face panel is sized to cover at least one of the frame windows, and is removably fixedly joinable to the frame. The bezel frame provides a common part to which various, interchangeable face panels may be attached.

13 Claims, 4 Drawing Sheets

MODULAR CABINET BEZEL

BACKGROUND OF THE INVENTION

The present invention relates generally to consumer product cabinet design, and, more specifically, to the ornamental front face or bezel of the cabinet.

A personal computer (PC) is an exemplary consumer product wherein the operative electronic devices including the central processing unit (CPU), power supply, and various disk drives are mounted to a structural chassis and enclosed by a cabinet which is typically sheet metal on its two sides, top, and back. The front of the cabinet is typically enclosed by a one piece molded plastic bezel which is typically mounted to the remainder of the cabinet using screws threaded into its back side and accessible from inside the cabinet.

The bezel is configured to have various windows for providing user access to data storage devices such as magnetic disk drives. The bezel is also used to mount the power switch of the computer and various indicator lights for example.

Since the bezel covers the front side of the computer, it is also the ornamental or cosmetic side thereof. Accordingly, this design varies among different manufacturers in configuration and ornamentation including color, texture, design, and manufacturer identification logos or trademarks. Each bezel is typically unique in configuration for a given product and must be separately designed and manufactured using tooling specifically configured therefor. Significant cost and manufacturing time result.

SUMMARY OF THE INVENTION

A modular bezel for the front side of a cabinet includes a bezel frame fixedly joinable to the cabinet, with the frame including a plurality of windows therethrough for providing access into the cabinet. A face panel is sized to cover at least one of the frame windows, and is removably fixedly joinable to the frame. The bezel frame provides a common part to which various, interchangeable face panels may be attached.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
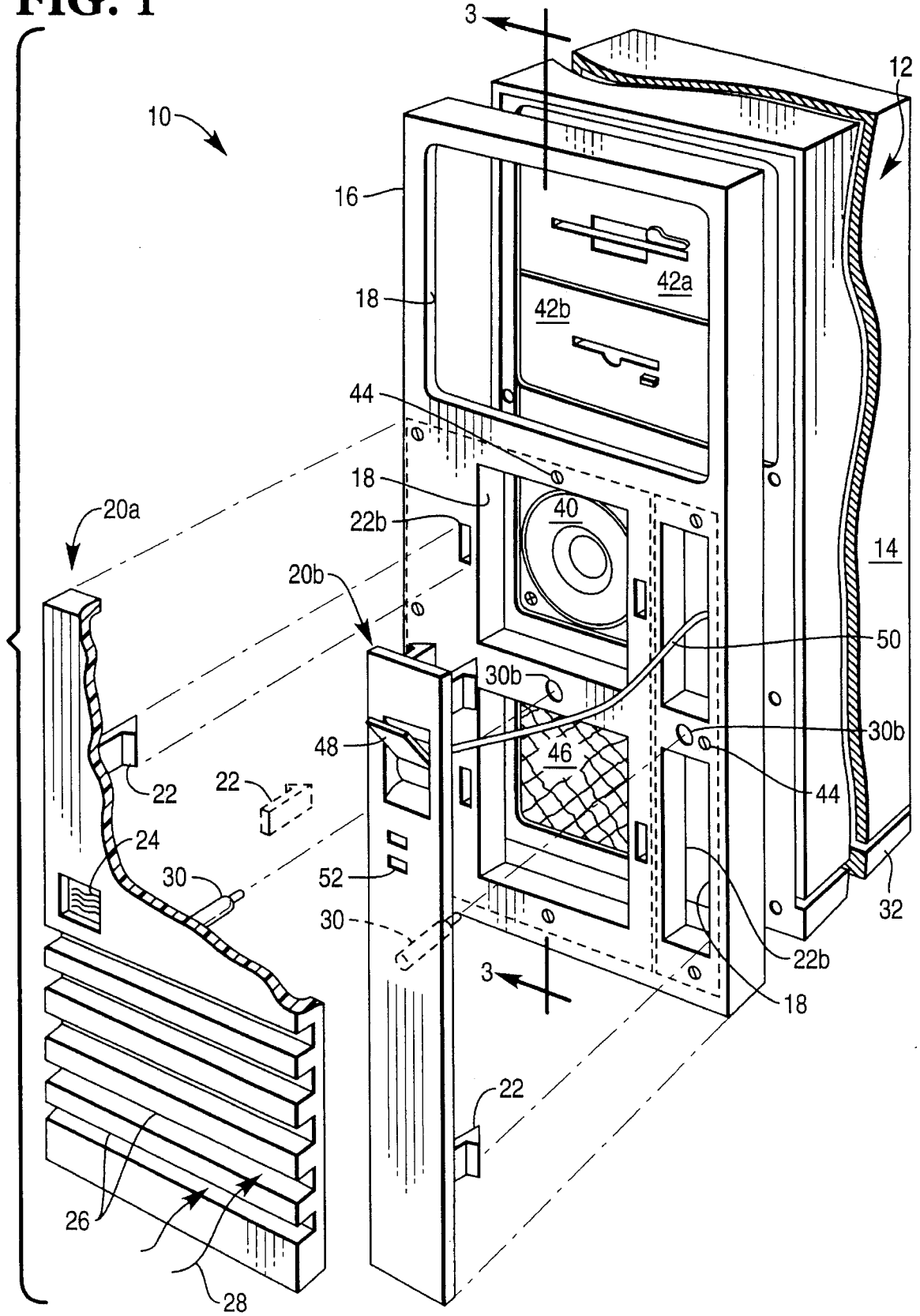
FIG. 1 is an exploded, perspective view of a modular bezel in accordance with an exemplary embodiment of the present invention for covering the front side of a cabinet in the exemplary form of a personal computer.

Illustrated in FIG. 1 is an exploded view of a modular front cover or bezel 10 for enclosing the front side of a cabinet 12 of a consumer product such as a personal computer (PC) 14. The bezel 10 is an assembly of components including a rectangular bezel frame 16 which is removably fixedly joinable to the front side of the cabinet 12. The bezel frame 16 includes a plurality of spaced apart openings or windows 18 which extend completely therethrough for providing access into the front side of the cabinet 12. In the exemplary embodiment illustrated in FIG. 1, five exemplary windows 18 are provided which are rectangular in configuration and have various sizes as desired.

Figure 2:
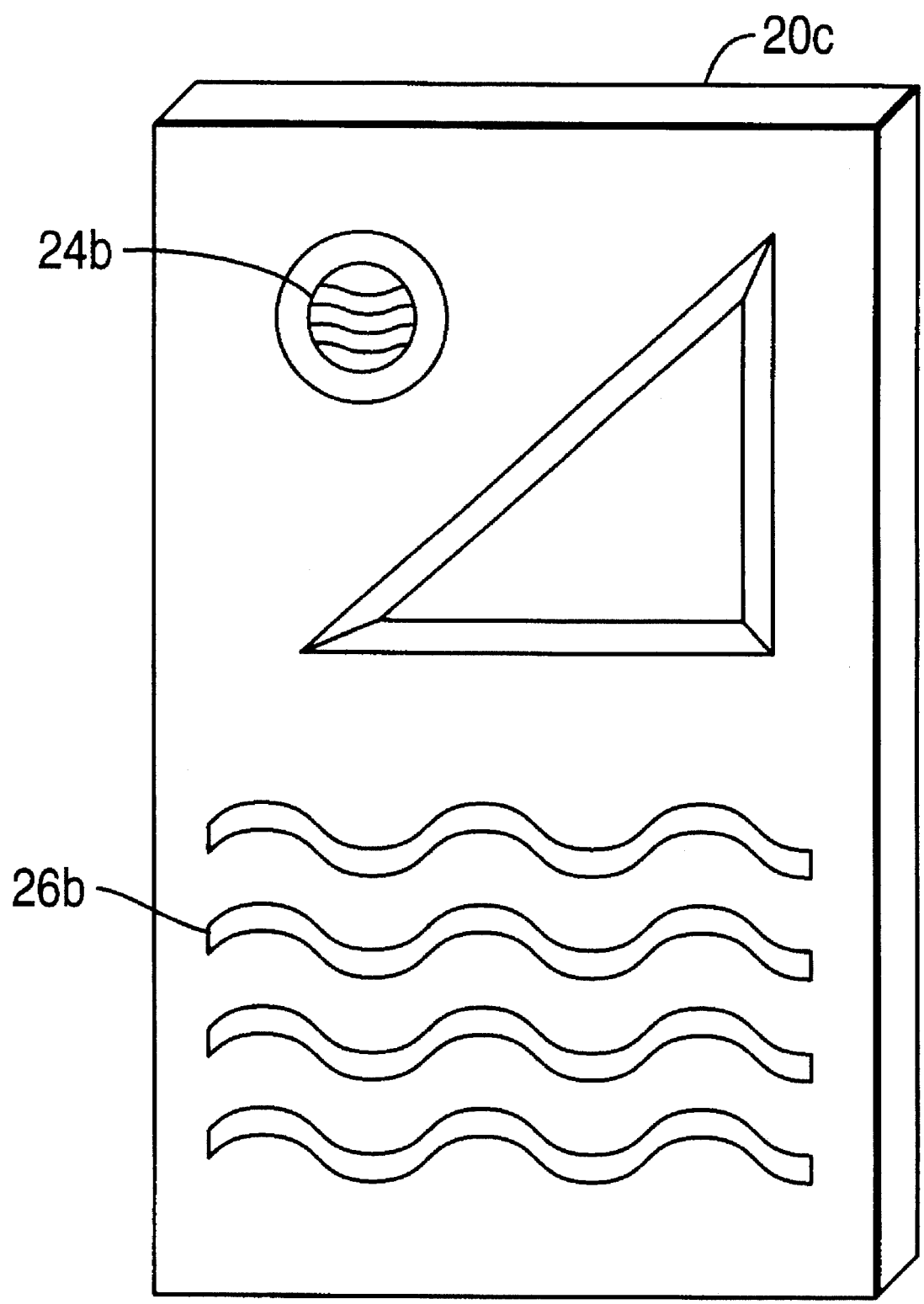
FIG. 2 is a perspective view of a bezel face panel having a different ornamental design than one of the face panels illustrated in FIG. 1 and is interchangeable therewith.

At least one, and two, for example, bezel face panels 20a and 20b are suitably sized and configured to cover at least one of the frame windows 18, and in this exemplary embodiment collectively cover the bottom four windows 18. Suitable means in the exemplary form of hooks 22 are provided for removably fixedly joining the face panels 20a,b to the bezel frame 16. The face panels 20a,b are at least in part ornamental or cosmetic since they directly face the user, and are interchangeable in accordance with a major objective of the present invention with similarly configured face panels having different ornamental, as well as functional designs. FIG. 1 illustrates an exemplary design for the first and second face panels 20a and 20b. FIG. 2 illustrates a third bezel face panel 20c which is directly interchangeable with the first face panel 20a on the frame 16 but has a different ornamental appearance or design.

In this way, a single-design bezel frame 16 may be made for a given application. The appearance as well as functionality of the PC 14 for different manufacturers may be readily altered as desired by merely designing and providing different face panels 20a,b. This can significantly reduce the cost and manufacturing time to modify substantially functionally identical PCs 14 to accommodate the different ornamental appearances and company logos required for various manufacturers that in turn sell PCs to the consuming public.

As shown in FIG. 1, the front sides of the first and second panels 20a,b face outwardly or forwardly toward the user. They may have any suitable ornamental or functional appearance as desired. In the exemplary embodiment illustrated in FIG. 1, the first panel 20a includes a suitable recess in its front face in which is suitably secured a company's logo badge 24 or nameplate as desired. The top half of the first panel 20a is otherwise smooth and plain, with its bottom half having conventional louvers 26 which are both ornamental and functional since they provide inlets into the cabinet 12 for room air 28 which is used for conventionally cooling the internal components of the PC 14. In the FIG. 2 embodiment, the ornamental appearance thereof may be substantially different and includes a different logo badge 24b and differently configured louvers 26b.

The bezel frame 16 and its various panels 20a,b,c are preferably made of molded plastic in a conventional manner. A suitable number of the hooks 22 may be integrally formed during the molding process and extend aft from the back side of the panels 20a,b,c for engaging respective and complementary ridges or latches 22b formed integrally in the bezel frame 16. Hooks and latches are well known devices for removably joining components together. The exemplary hooks 22 and latches 22b may take any suitable form which allows the panels 20a–c to be readily attached to the frame 16 by pushing, and disassembled therefrom by pulling. In the exemplary embodiment illustrated in FIG. 1, the latches 22b for the hooks 22 of the first panel 20a are defined by complementary holes or sockets integrally formed in the frame 16, with the hooks 22 resting on aft edges thereof. The latches 22b for the hooks 22 of the second panel 20b are merely the back edges of the windows 18 hidden behind the second panel 20b upon which the hooks 22 may rest. Other configurations of the hooks 22 and latches 22b may be used as desired. And, the panels 20a–c may be otherwise removably joined to the frame 16 using conventional Velcro, or even suitable glue if desired.

To assist in aligning the panels 20a–c to the frame 16 during assembly, the panels 20a–c preferably also include a suitably centrally positioned alignment pin 30 which extends integrally rearwardly from the back side of the panels 20a–c for engaging a complementary alignment hole 30b disposed in the front side of the frame 16. The alignment pin 30 of each of the panels 20a–c is initially inserted into its respective hole 30b so that the panels 20a–c may be pushed into final position with the respective hooks 22 engaging the respective latches 22b for retaining the panels 20a–c to the common frame 16.

Figure 3:
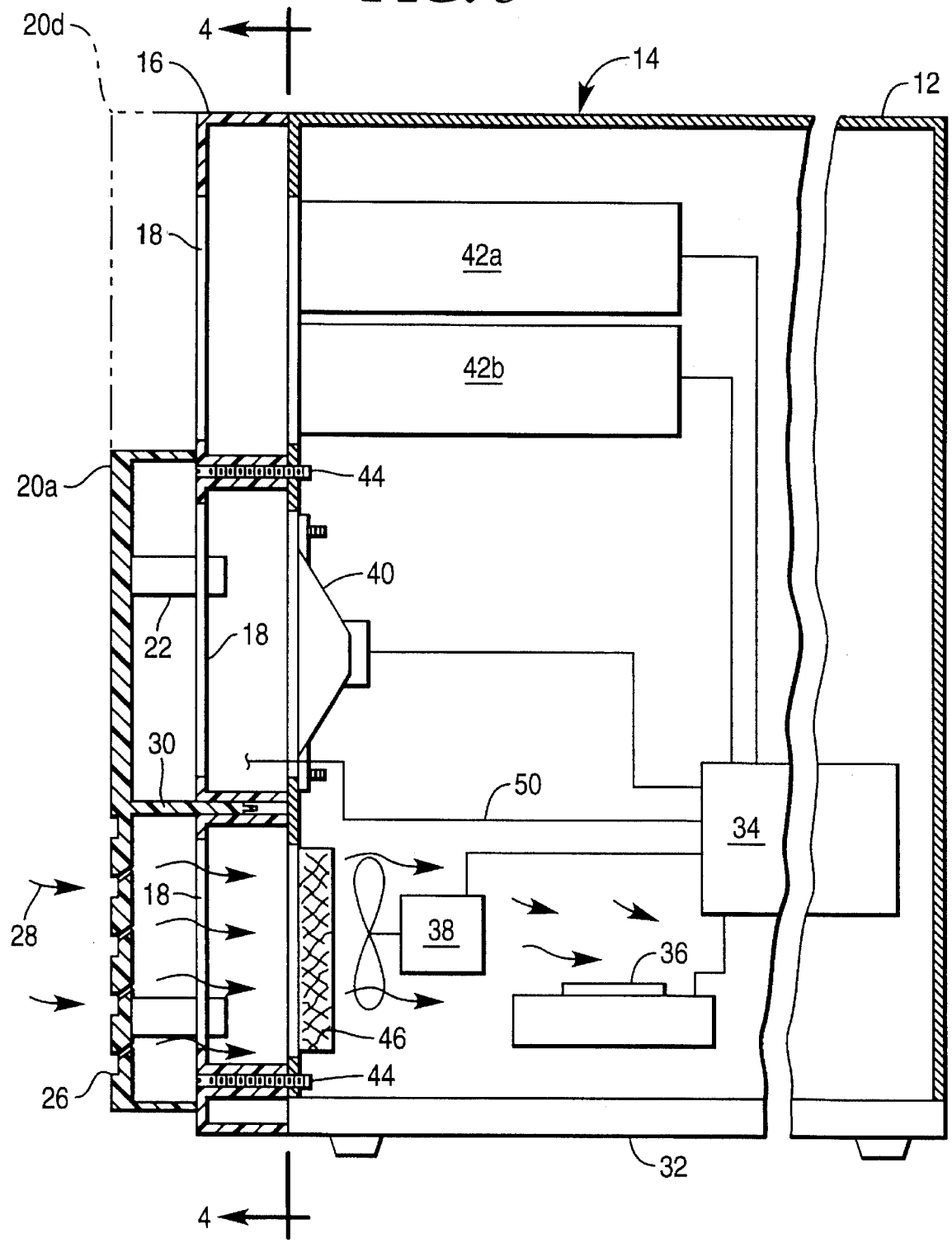
FIG. 3 is an elevational, partly sectional, schematic view of the cabinet illustrated in FIG. 1 with the bezel frame and face panel being assembled thereto.

FIG. 3 illustrates schematically exemplary internal components of the PC 14. The PC 14 has a structural frame or chassis 32 to which is mounted its various operating components. For example, the PC 14 includes a conventional power supply 34 and a conventional central processing unit (CPU) 36. A conventional electric fan 38 is joined to the power supply 34 for circulating the room air 28 through the cabinet 12 to cool the various components thereof. A conventional speaker 40 is mounted to the front side of the chassis 32. The PC 14 also includes one or more data storage devices such as conventional magnetic disk drives 42a and 42b for example. The PC 14 also includes an internal hard disk or memory storage device (not shown) as well as other conventionally known components (also not shown).

The disk drives 42a,b use conventional removable data elements such as floppy magnetic disks which are insertable and removable by the user. The disk drives 42a,b may take any conventional form such as the magnetic disk drives illustrated, or CD ROM drives, or tape drives as are conventionally Known. The disk drives 42a,b face forwardly at the front end of the cabinet 12, with the top window 18 of the frame 16 being suitably aligned therewith to allow the user direct access to both disk drives 42a,b for inserting and removing the data element therefor.

The bezel frame 16 may be suitably attached to the front side of the cabinet 12 in a conventional manner such as by using screws which thread into the back side of the frame 16 and are accessible from inside the cabinet 12. However, as illustrated in FIGS. 1 and 3, suitable fasteners 44 such as screws may instead be accessible from the front side of the frame 16 for joining the frame 16 to the cabinet 12 or chassis 32, with the fasteners 44 extending through suitable bosses formed on the back side of the frame 16, and threadingly engaging the front side of the cabinet 12. As shown more clearly in FIG. 1, the panels 20a,b are preferably sized and configured to cover or hide the fasteners 44 once they are assembled to the frame 16. In this way, the fasteners 44 are hidden but are nevertheless accessible from the front side of the cabinet 12 by simply removing the panels 20a,b.

As shown in FIG. 1, five windows 18 are provided for providing access to the different components inside the cabinet 12. The first panel 20a covers at least one of the windows 18, and in the exemplary embodiment covers two vertically aligned windows 18. The top window 18 behind the first panel 20a is aligned with the speaker 40 for allowing unobstructed sound propagation therefrom while also providing access to the speaker 40 itself which may also be removed from the front side of the cabinet 12 after simply removing the first panel 20a. Of course, the speaker 40 could be otherwise positioned, with this central window 18 providing access to the inside of the cabinet 12 for any suitable purpose as desired.

As shown in FIGS. 1 and 3, a suitable air filter 46 may be positioned upstream of the fan 38 and suitably fixedly joined to the front side of the cabinet 12 or chassis 32 in alignment with the bottom window 18 covered by the first panel 20a. In this way, the first panel 20a may be removed which makes accessible the filter 46 from the front side of the cabinet 12, with the filter 46 being also manually removable.

As shown in FIG. 1, the second panel 20b is preferably configured as a control panel and includes a conventional power switch 48 having a suitable electrical cable 50 extending therefrom through one of the frame windows 18 into the cabinet 12 where it is conventionally joined to the power supply 34. The second panel 20b may also include conventional indicator lights 52 as shown in FIG. 1 which are suitably joined by dedicated conductors inside the cable 50 to provide monitoring of the PC components in a conventional fashion. The power switch 48 and lights 52 may be suitably joined to the second panel 20b, with the cable 50 having suitable length for allowing the second panel 20b to be removed from or assembled to the frame 16.

Figure 4:
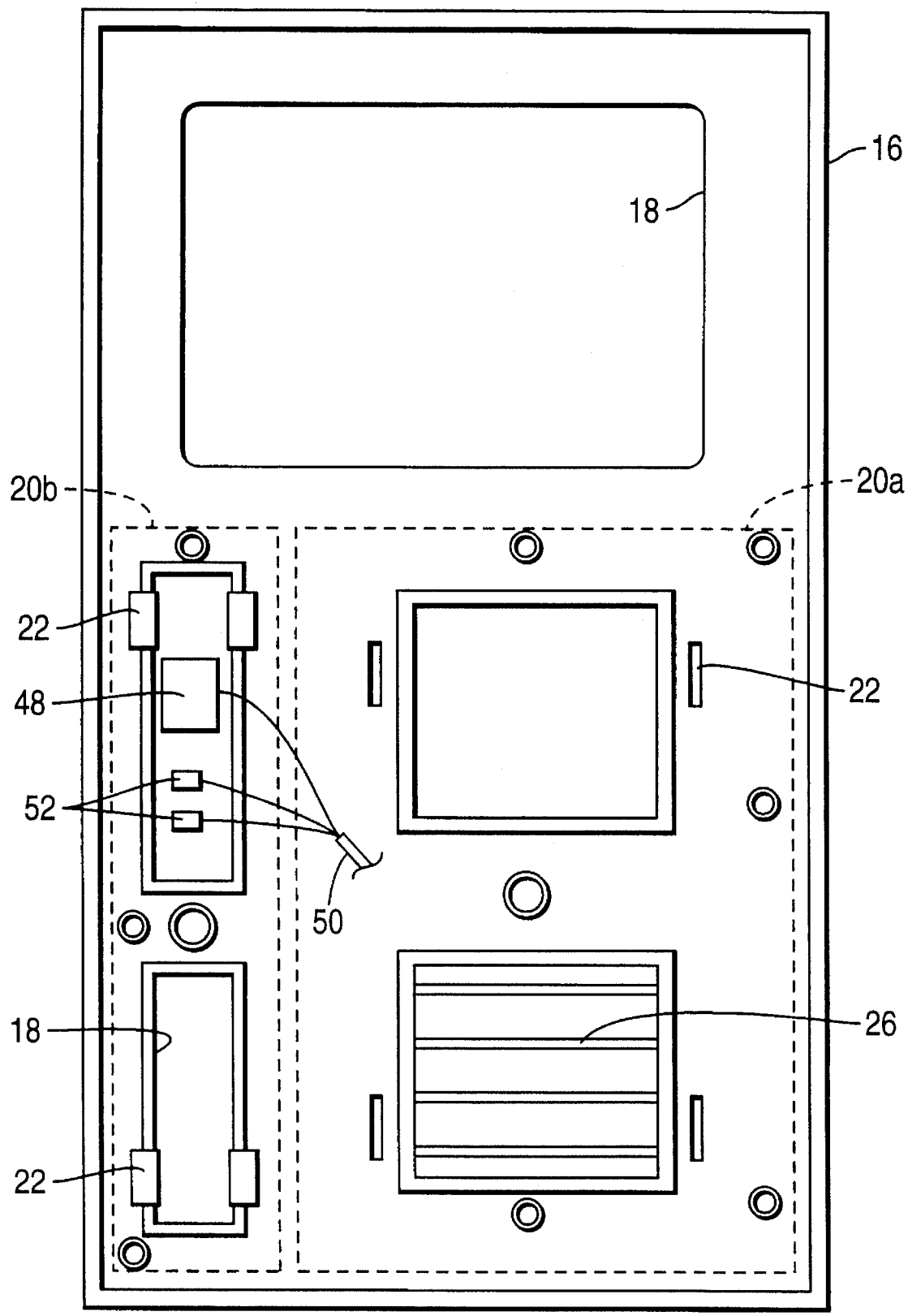
FIG. 4 is an elevational view of the back side of the bezel illustrated in FIG. 3 and taken along line 4—4.

As shown in FIG. 1 and additionally in FIG. 4, the first and second panels 20a,b collectively cover at least the lower portion of the bezel frame 16 and leave exposed at least the one frame window 18 of the upper portion of the frame 16 in this exemplary embodiment. The first panel 20a covers the lower left two windows 18, and the second panel 20b covers the lower right two windows 18. The bottom window 18 covered by the second panel 20b is empty in this exemplary embodiment and may be used for providing access to the inside of the cabinet 12 if desired. Of course, any number of the windows 18 including one or more may be provided and suitably covered as desired by one or more of the bezel panels 20a,b.

As shown in FIG. 1 and 4, the two panels 20a, 20b are preferably rectangular and are disposed side by side for covering the lower half of the bezel frame 16. In alternate embodiments, either or both of the two panels 20a,b could extend the full height of the frame 16 and be configured as appropriate to include a window within the panel itself for providing access to the disk drives 42a,b if desired.

The improved bezel 10 disclosed above readily and inexpensively allows for different ornamental or functional features to be obtained using the common bezel frame 16. Changes in design of the first and second panels 20a,b change the overall appearance of the front side of the cabinet 12 to accommodate the different requirements of different manufacturers. Different color schemes, textures, ornamental designs, and company logo badges may be specifically configured for particular panels 20a,b with cost of development and production being relatively small compared to producing and manufacturing a unique single piece bezel for each different application as is currently practiced in the art.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A modular bezel for covering a front side of a cabinet containing an electrical device comprising:

a bezel frame fixedly joinable to said cabinet, and including a plurality of windows therethrough for providing access into said cabinet, said frame further including a plurality of fasteners accessible from a front side of said frame for joining said frame to said cabinet;

a bezel face panel sized to cover at least one of said frame windows and to cover said fasteners; and joining means for removably connecting said face panel to said frame.

2. A bezel according to claim 1 wherein said face panel is at least in part ornamental and is interchangeable with similarly configured face panels.

3. A bezel according to claim 2 wherein said face panel includes a control device joined thereto, and operatively joinable to said cabinet electrical device for use in controlling said device.

4. A bezel according to claim 2 wherein said joining means comprise a plurality of hooks extending aft from a back side of said panel for engaging a respective plurality of complementary latches disposed on said frame.

5. A bezel according to claim 4 wherein said joining means further comprise an alignment pin extending from said back side of said panel for engaging a complementary alignment hole disposed in said frame.

6. A bezel according to claim 2 in combination with said cabinet and electrical device therein to define a consumer product, and further comprising a plurality of said electrical devices disposed inside said cabinet, with said frame windows providing access to said devices.

7. A product according to claim 2 further comprising:

a first one of said panels removably connected to said frame to cover at least one of said windows; and a second one of said panels disposed adjacent to said first panel and removably connected to said frame to cover another one of said windows, said second panel including a control device joined thereto, and operatively joined to said cabinet electrical device for use in controlling said device.

8. A product according to claim 7 in the form of a personal computer (PC), with said cabinet containing a central processing unit (CPU) and at least one data storage device using a removable data element, and one of said frame windows is aligned with said storage device to allow user access thereto.

9. A PC according to claim 8 wherein said first panel is sized to cover at least two of said frame windows to provide access thereto upon disassembly of said first panel from said frame.

10. A PC according to claim 9 further comprising:

an electric fan disposed inside said cabinet;

an air filter removably connected to said cabinet at a respective one of said frame windows covered by said first panel; and said filter is accessible and manually removable upon removal of said first panel from said frame.

11. A PC according to claim 9 wherein said second panel includes a power switch having a cable extending into said cabinet for switching said PC on and off.

12. A PC according to claim 9 wherein said first and second panels collectively cover at least a portion of said frame and leave exposed at least one frame window.

13. A method of altering said modular bezel according to claim 1 comprising:

providing a plurality of different ones of said face panels being similarly configured for interchangeability on said frame, but having different ornamental appearances; and affixing one of said different face panels on said frame.

\* \* \* \* \*